US005717558A

United States Patent [19]
Lynn et al.

[11] Patent Number: 5,717,558
[45] Date of Patent: Feb. 10, 1998

[54] ELECTROSTATIC DISCHARGE PROTECTION FOR AN ELECTRICAL DEVICE

[75] Inventors: Dale Everett Lynn, Freehold; Mark S. Paradiso, North Haledon; Douglas Charles Smith, Rumson, all of N.J.

[73] Assignee: Lucent Technologies Inc., Murray Hill, N.J.

[21] Appl. No.: 565,529

[22] Filed: Nov. 30, 1995

[51] Int. Cl.$^6$ .................................................... H02H 9/00
[52] U.S. Cl. .................................................... 361/56; 361/119
[58] Field of Search .............................. 361/18, 56, 86, 361/88, 91, 111, 119, 212; 324/501, 522, 536, 618; 340/649, 653, 654, 660, 662; 371/51.1, 64, 72; 364/483, 486, DIG. 1, DIG. 2

[56] References Cited

U.S. PATENT DOCUMENTS

| | | | |
|---|---|---|---|
| 4,752,862 | 6/1988 | Takahashi et al. | 361/212 |
| 4,819,237 | 4/1989 | Hamilton et al. | 371/66 |
| 5,359,319 | 10/1994 | Campbell et al. | 340/649 |
| 5,426,690 | 6/1995 | Hikuma et al. | 379/62 |

*Primary Examiner*—Ronald W. Leja
*Attorney, Agent, or Firm*—Samuel R. Williamson

[57] ABSTRACT

Electrostatic discharge (ESD) protection for an electrical device is provided through an arrangement which detects an ESD event occurring in the device and reconfigures a processor in the device after the ESD event so that the event is essentially transparent to a user of the device. A detector circuit incorporated into the device detects the occurrence of the ESD event and, in response thereto, generates a trigger signal which is coupled to the processor. Upon receipt of this trigger signal, the processor retrieves status information that is stored in non-volatile memory and was previously contained in a program being executed just prior to the ESD event, reconfigures itself using the status information, and resumes operation with this status information. A data latch connects to the processor and buffers data from this processor to circuitry controlled by the processor. During the occurrence of the ESD event, the trigger signal is coupled to the data latch for holding the data in an output buffer in the latch. This data, generated by the processor just prior to the occurrence of the ESD event, maintains the circuitry normally controlled by the processor in its appropriate operating state while the processor is being reconfigured.

37 Claims, 5 Drawing Sheets

ELECTROSTATIC DISCHARGE PROTECTION FOR AN ELECTRICAL DEVICE

TECHNICAL FIELD

BACKGROUND OF THE INVENTION

1. Technical Field

This invention relates generally to electrical devices and, more particularly, to arrangements which provide protection against electrostatic discharge (ESD) events occurring to such devices.

2. Description of the Prior Art

Many electrical devices available in today's consumer market incorporate processors for providing access to and control of numerous functions and features found in such devices. Unfortunately, some of these electrical devices are vulnerable to ESD events that occur occasionally. An ESD event can deliver amperes of current and a voltage change of kilovolts in picoseconds of time. The shear magnitude of the resulting di/dt, dv/dt, and associated electromagnetic fields can easily disrupt circuit operation and even cause physical damage to circuit components in a device.

ESD events may occur in a number of ways. By way of an illustrative example, cordless telephones that are presently available in the art generally have exposed metallic contacts to which an ESD event may occur. In operation, when the handset unit of the cordless telephone is removed from a cradle in the associated base unit of the cordless telephone, the metallic contacts on both the base unit and the handset unit are exposed and a person is able to touch the contacts on these units. If that person happens to be electrically charged with static electricity and touches a metallic contact, unfortunately, the electrical potential then held by that person may be discharged into the processor, which is connected to the touched metallic contact via ESD-sensitive circuitry. Such electrical potential, when received by the processor, could possibly cause it to malfunction, i.e., a program flow being executed by the processor is lost.

In general, attempts have been made to address these ESD events so that their occurrences do not cause device failure due to component damage or malfunctions in which a processor loses sanity. One commonly known procedure for minimizing ESD events is to add protection circuitry that adequately shields the processor and other ESD-sensitive circuitry in the device. Since the sole purpose of the protection circuitry is to address the ESD events that occur only occasionally, the extent to which this protection circuitry is employed in a device often is controlled by factors such as the cost of and space considerations in the electrical device.

Another procedure, that is widely known and practiced, for minimizing ESD events is constructing a ground system that can dissipate the high transient currents generated during an ESD event in electrical devices. In the construction of such a ground system, a designer has to avoid the inductive effects of narrow single circuit traces. Typically, this requires constructing a grid-type ground system or, ideally, a ground plane. By incorporating such structure, however, the component density is limited and the designer must employ double-sided or multilayer boards for mounting the components in the device. This reduced component density has the undesirable effect of increasing the size of the device just to address the ESD event problem. The ground system, therefore, requires additional structure that is costly and often difficult to implement.

Although incorporating protection circuitry and/or a ground system improves the protection afforded a processor and other circuitry in an electrical device, each approach makes a device larger and more expensive than it otherwise would be in order to address the ESD event problem. The architecture or physical design of some devices available in the prior art has thus been unnecessarily constrained by ESD considerations. It is therefore desirable to provide an arrangement which minimizes the effect that an ESD event has on the operation of circuitry in a device including a processor while minimizing costs associated with such an arrangement.

SUMMARY OF THE INVENTION

In accordance with the invention, an arrangement is provided for detecting an ESD event in an electrical device and reconfiguring a control unit or processor in the device after the occurrence of such an event so that the event is essentially transparent to a user of the device.

In a first aspect of the invention, such operation is economically achieved through use of a detector circuit incorporated into the device. This detector circuit detects the occurrence of the ESD event and, in response thereto, generates a trigger signal which is coupled to the processor. Upon receipt of this trigger signal, the processor retrieves status information contained in a program being executed just prior to the ESD event, reconfigures itself using such status information, and continues operating in a graceful way after reconfiguring itself with the status information.

In a second aspect of the invention, circuitry controlled by the processor is maintained in an appropriate operating state while the processor is being reconfigured. A data latch connected to the processor buffers data from the processor to the circuitry controlled by the processor. During the occurrence of the ESD event, the trigger signal is coupled to the data latch for continuing to make available, at the output of the data latch, the data generated by the processor just prior to the occurrence of the ESD event. This data maintains the circuitry in the device in its appropriate operating state while the processor is being reconfigured. As a result, the ESD event appears essentially transparent to a user of the device.

BRIEF DESCRIPTION OF THE DRAWING

This invention and its mode of operation will be more clearly understood from the following detailed description when read with the appended drawing in which.

Throughout the drawing, the same element when shown in more than one figure is designated by the same reference numeral.

DETAILED DESCRIPTION

Two considerations must be addressed generally in designing a device that will be minimally affected by ESD events. A first consideration is the requirement to make the design robust enough such that the processor and other components in the device do not experience component damage during an ESD event. An arrangement which addresses this consideration is disclosed in U.S. patent application Ser. No. 08/432,577, filed on May 1, 1995 for S. Messina et al. and commonly assigned to the same assignee as this application. The arrangement disclosed by Messina et al., provides switching apparatus for isolating sensitive circuitry from static electricity which may be impressed upon the exposed metallic surfaces.

A second consideration that must be addressed in the designing of a device that will be minimally affected by ESD events is to ensure that the processor and other components in the device do not experience abnormal operation or lock-up after the occurrence of such an event.

Figure 1:
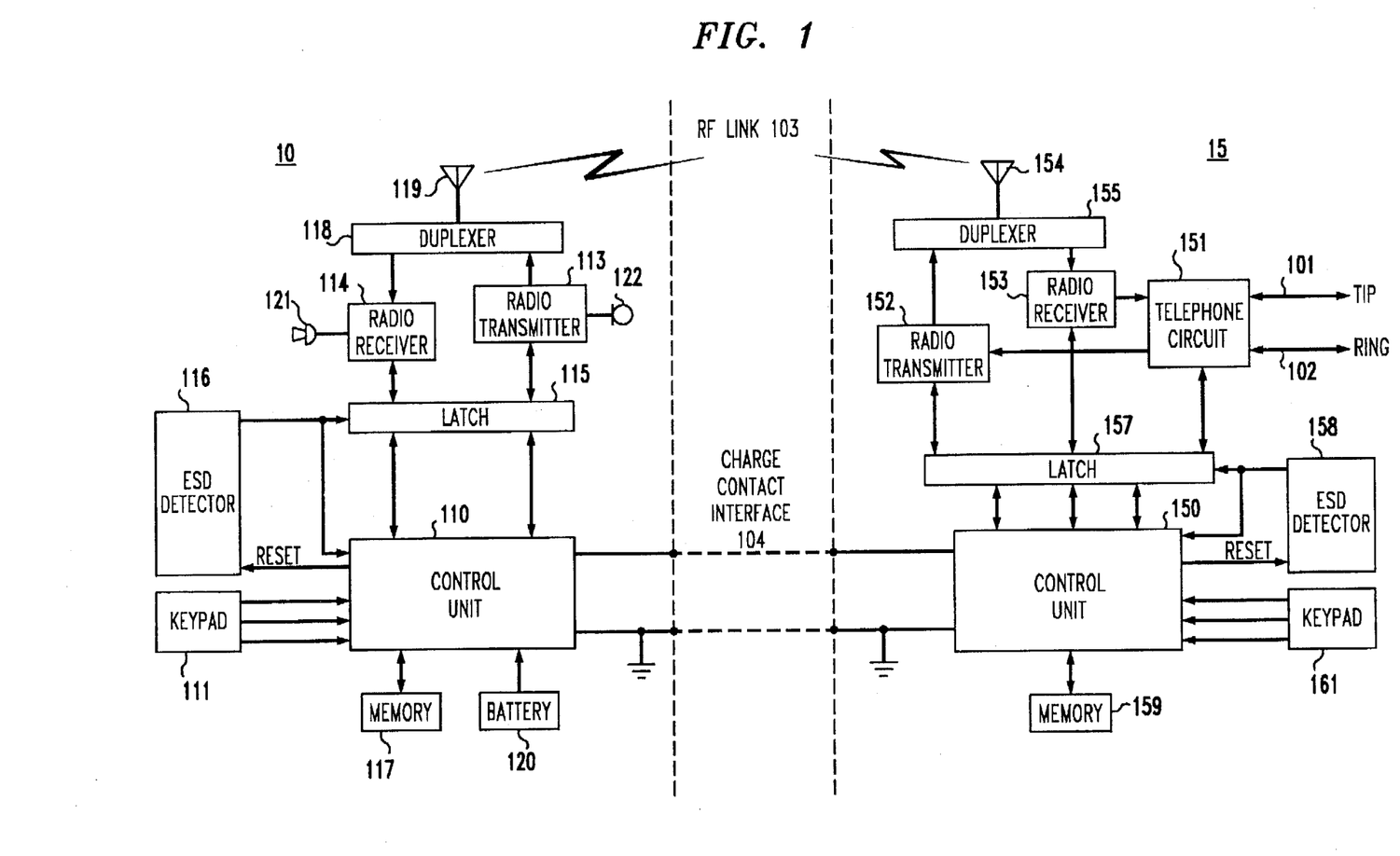
FIG. 1 is a functional block representation of an electrical device, illustratively shown as a cordless telephone, suitable for incorporating the electrostatic discharge protection arrangement in accordance with the principles of the invention.

Referring now to FIG. 1, there is shown a functional block representation of an electrical device such as, by way of illustrative example, a cordless telephone which embraces the considerations described hereinabove and allows for the possibility that a processor and other components employed therein may experience abnormal operation or lock-up after the occurrence of an ESD event. With an ESD event protection arrangement, operative in accordance with the disclosed embodiment, the cordless telephone design needs to be only robust enough such that the processor and other components in the telephone do not experience component damage.

As shown, the cordless telephone comprises generally a handset unit 10 and a base unit 15 which are both operable over a radio frequency (RF) link 103 consisting of one or more channels from a plurality of communication channels. Included in the handset unit 10 is a processor or control unit 110 which advantageously provides a number of control functions and may be implemented through the use of a microcomputer containing read-only-memory (ROM), random-access-memory (RAM) and through use of the proper coding. Such a microcomputer is known in the art and is readily available from semiconductor manufacturers such as Signetics, Intel and AMD.

The control unit 110 stores security code data that is generated by the base unit 15 and provided to the handset unit 10 in accordance with the teachings of U.S. Pat. No. 4,736,404 which issued to R. E. Anglikowski, et al. on Apr. 5, 1988. The security code data stored in control unit 110 is transmitted from the handset unit 10 to the base unit 15 while establishing initial communications in accordance with the teachings of U.S. Pat. No. 4,731,814 which issued to W. R. Becker et al. on Mar. 15, 1988. This security code data is also transmitted from the handset unit 10 during the transfer of subsequent opcode data to the base unit.

The control unit 110 also configures an RF transmitter 113 and an RF receiver 114 for operation on the appropriate one or more of the plurality of channels. The transmitter 113 and the receiver 114 respectively transmit signals to and receive signals from the base unit 15 with the control unit 110 providing the appropriate channel control information through a data latch 115 to both units. Thus, the state of the transmitter 113 and the receiver 114, i.e., configured either ON or OFF, and a frequency of operation for these units are selected by the control unit 110. The data latch 115 includes a data register and an output buffer for storing at its output the data last received at its input. Such a data latch is known in the art and is readily available from semiconductor manufacturers such as Signetics, Intel, Texas Instruments and AMD.

Operating data for the control unit 110 is stored in RAM internal to this control unit. This operating data for the control unit 110 also is stored in non-volatile memory 117. Memory 117 may be electrical-erasable-read-only memory (EEPROM) that is generally commercially available or, alternatively, it may be volatile memory, i.e., a second RAM, that is isolated from the control unit and the effects of an ESD event occurring in the handset unit 10.

The operating data reflects the current status of the handset unit. This operating data or status information includes, inter alia, instructions and channel control information that the control unit 110 uses to: 1) operate the transmitter 113 and receiver 114; 2) send out data (i.e., opcode and security code data); 3) store information as to whether the handset unit is actively involved in a telephone call, and thus maintain an off-hook status signal to the base unit; and 4) store information as to whether the handset unit and the base unit are involved in an INTERCOM call.

The status information stored in memory 117 is continually updated, as described in detail later herein with reference to the flow chart shown in FIG. 6. Thus, an updated "image" of the information stored in the RAM memory in the control unit also is provided to memory 117.

An ESD detector circuit 116 is employed for detecting the occurrence of an ESD event in the handset unit 10. In accordance with the disclosed embodiment of the invention, this detector circuit 116 reconfigures the control unit 110 after the occurrence of an ESD event so that the event is essentially transparent to a user of the cordless telephone. The ESD detector 116 connects to both the control unit 110 and the latch 115 for providing a trigger signal for configuring both this control unit 110 and the latch 115. The ESD detector also connects to the control unit for receiving a reset signal coupled through the control unit 110 from, for example, the keypad 111 for common application to a reset function accessible at an external input on the control unit 110 as well as cradle detect circuitry (not shown) in this control unit.

When the detector 116 detects the occurrence of an ESD event, it generates a trigger signal which is coupled to the control unit 110. Upon receipt of this trigger signal, the control unit 110 retrieves from the memory 117 the status information contained in a program being executed by it just prior to the ESD event and reconfigures itself using such status information.

The trigger signal from the detector 116 also is coupled to the latch 115 in response to the occurrence of the ESD event. During normal operation, i.e., when the ESD event is not present, the data latch 115 couples data received from the control unit 110 directly to the transmitter 113 and the receiver 114 as this data is received from the control unit. The latch 115 also couples information from the transmitter 113 and the receiver 114 to the control unit 110.

Once the trigger signal from the detector 116 is received by the latch 115, the data then present in the latch 115 for the transmitter 113 and the receiver 114 is held in the output buffer of the latch for a predetermined period after initial receipt of the trigger signal. This data in the buffer is thus provided to both the transmitter 113 and the receiver 114 over this period. ESD events have traditionally been observed to occur approximately over a 50 nanosecond period. However, such events have also been observed as occurring with a period as short as 1 nanosecond. Detector 116 will suitably detect and provide a trigger signal for an ESD event with either of these time periods. The period over which the trigger signal is generated is easy extended in a conventionally manner, either through hardware or software, by circuitry which operates as a monostable multivibrator (not shown). Such circuitry is set at typically 250 milliseconds and allows for the control unit 110 to fully recover from the ESD event. Thus, the transmitter 113 and the receiver 114 are both maintained in an appropriate operating state while the control unit 115 is being reconfigured.

The transmit and receive signals of the handset unit 10 are coupled to a duplexer 118 which permits both the transmitter 113 and the receiver 114 to simultaneously operate over antenna 119 while preventing the output of transmitter 113 from being coupled directly to the input of the receiver 114. The receiver 114 demodulates voice signals transmitted by the base unit 15 and couples these signals to a loudspeaker 121. The transmitter 113 has as its input speech signals from a microphone 122 which it transmits to the base unit 15. A battery 120 and keypad 111 also are included in the handset unit 10. The battery 120 provides operating power for all circuitry in this unit and the keypad 111 is used for entering dial digits and control functions executable by the control unit 110 or transmitted to the base unit 15.

In operation, the control unit 110 processes the appropriate channel selection and security code data selected for use in the handset unit 10 and generates a request-for-service signal which is transmitted by transmitter 113 over the last used channel while the handset unit and base unit are tuned to this channel. If this is the first use of the handset unit since initialization or start-up, a predetermined one of the multiple channels is used for this initial communication. The request-for-service signal includes a synchronizing signal and the security code generated by the control unit 110. Such a request-for-service signal may be generated in accordance with a procedure provided in AT&T's 5500 cordless telephone, presently commercially available, or with a procedure as disclosed in U.S. Pat. No. 5,353,341 which issued to M. E. Gillis on Oct. 4, 1994.

Referring next to the base unit 15, there is shown a control unit 150 which interfaces with the control unit 110 in the handset 10 and, while the handset 10 is located in a mating cradle in the base unit 15, generates and transfers the security code data to the control unit 110 through the charge contact interface 104. This control unit 150 also compares the received security code data with its stored security code data during the establishing of a two-way RF communications link between the handset unit 10 and the base unit 15. A favorable comparison of the data from the two security codes must be achieved in order for the base unit 15 to respond to a request-for-service signal from a handset unit. This control unit 150 also receives and processes opcode data provided by the handset unit 10 in dialing and providing signaling information out to a central office via a telephone circuit 151 and tip-ring lines 101 and 102. Like the control unit 110, this control unit 150 may be implemented through the use of a microcomputer containing ROM, RAM and through use of the proper coding. Such a microcomputer is known in the art and is readily available from semiconductor manufacturers such as Signetics, Intel and AMD.

Communications with the handset unit 10 are provided via transmitter 152 and receiver 153 in the base unit. The output of the transmitter 152 and input for the receiver 153 are commonly coupled to an antenna 154 through a duplexer 155. The telephone circuit 151 serves as a "plain old telephone service" (POTS) interface for signals on the tip-ring lines and for those signals received by the receiver 153 or transmitted by the transmitter 152. Responsive to the keypad 161, the telephone circuit 151 is configurable to either generate dual-tone-multiple-frequency (DTMF) signals or pulse signals for dialing over the tip-ring lines 101 and 102 which connect to the central office or other appropriate switch.

As in the handset unit, an ESD event similarly may occur in the base unit 15 of the cordless telephone and adversely affect the operation of the control unit 150. Thus, in accordance with the disclosed embodiment, a latch 157, an ESD detector 158 and a non-volatile memory 159 are provided in the base unit 15 for: 1) detecting an ESD event in the base unit 15; 2) reconfiguring the control unit 150 after the occurrence of the ESD event; and 3) maintaining the operating state of the telephone circuit 151 and both the transmitter 152 and receiver 153 so that the event appears essentially transparent to a user of the telephone.

Operating data for the control unit 150 is stored in RAM internal to this control unit. This operating data for the control unit 150 also is stored in the non-volatile memory 159. Memory 159 may be electrical-erasable-read-only memory (EEPROM) that is generally available or, alternatively, it may be volatile memory that is isolated from the control unit and the effects of an ESD event occurring in the base unit 15.

The operating data reflects the current status of the base unit. This operating data or status information includes, inter alia, instructions and channel control information that the control unit 150 uses to: 1) operate the telephone circuit, the transmitter 152 and receiver 153; 2) send out data (i.e., opcode and security code data); 3) store information as to whether the base unit is actively involved in a telephone call, and thus to maintain an off-hook state on the tip-ring lines 101 and 102; 4) store information as to whether the base unit and the handset unit are involved in an INTERCOM call; and 5) configure the telephone circuit 151 for sending out tones or pulse signals over the tip-ring lines 101 and 102.

The status information stored in memory 159 is continually updated. Thus, an updated "image" of the information stored in the RAM memory in the control unit is also provided to memory 159. As indicated earlier herein, the ESD detector circuit 158 detects the occurrence of an ESD event in the base unit 15. In accordance with the disclosed embodiment of the invention, this detector circuit 158 reconfigures the control unit 150 after the occurrence of an ESD event so that the event appears essentially transparent to a user of the cordless telephone. The ESD detector 158 connects to the control unit 150 and the latch 157 for providing a trigger signal for configuring both this control unit 150 and the latch 157. The ESD detector 158 also connects to the control unit 150 for receiving a reset signal coupled through the control unit 150 from, for example, the keypad 161 for common application to a reset function accessible at an external input on the control unit 150.

When the detector 158 detects the occurrence of an ESD event, it generates a trigger signal which is coupled to the control unit 150. Upon receipt of this trigger signal, the control unit 150 retrieves from the memory 159 the status information contained in a program being executed by it just prior to the ESD event and reconfigures itself using such status information.

The trigger signal from the detector 158 also is coupled to the latch 157 in response to the occurrence of the ESD event. During normal operation, the data latch 157 couples data received from the control unit 150 through its internal register and output buffer to the transmitter 152 and the receiver 153 as this data is received from the control unit 150. The latch 157 also couples information from the transmitter 152 and the receiver 153 to the control unit 150.

Once the trigger signal from the detector 158 is received by the latch 157, the data then present in the latch 157 for the telephone circuit 151, transmitter 152 and receiver 153 is held in the output buffer of the latch for a predetermined period, typically 250 milliseconds, as described earlier herein, after initial receipt of the trigger signal. This held data is provided to the telephone circuit 151 and to both the transmitter 152 and the receiver 153 over this period.

Figure 2:
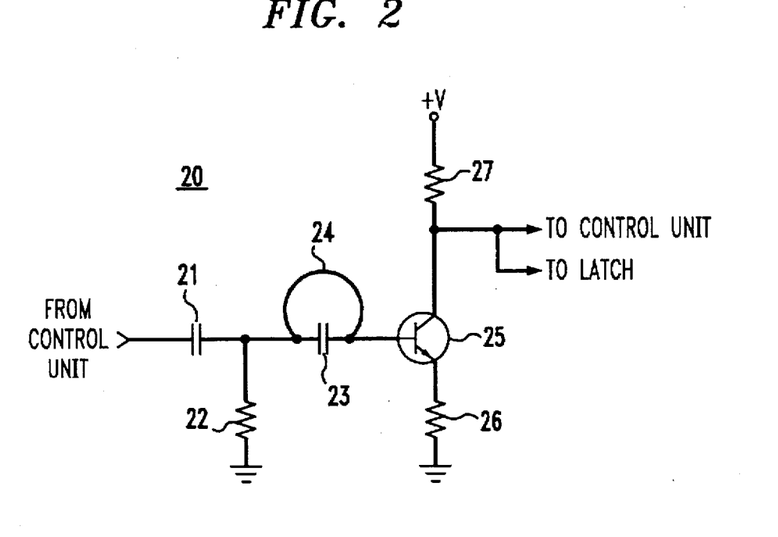
FIGS. 2 through 5 show various embodiments of electrostatic discharge detector circuits suitable for incorporating into the electrical device shown in FIG. 1, in accordance with the principles of the invention.

Referring next to FIG. 2, there is shown an ESD detector circuit 20 suitable for use respectively as detector 116 or detector 158 and for providing a reset signal to either control unit 110 or control unit 150, these components all being shown in FIG. 1. The ESD detector is advantageously combined with an existing reset function that is normally provided to a control unit via a driver transistor 25 whose base is connected to a reset signal input from another source through the control unit. Such other source may be the cradling of the handset unit 10 into the base unit 15, activation of a reset button or a series of button presses on a keypad 111 or 161, both shown in FIG. 1. Since the reset circuitry, including the transistor 25, is already present in most devices, adding the circuitry necessary to achieve the ESD detector function adds negligible cost to a device. Even if the reset circuitry were not present in a device, adding the ESD detector circuit would add minimal cost to a device.

An isolation capacitor 21 isolates any direct current (DC) loading of resistor 22 on a reset signal coupled from the control unit through this capacitor. In addition, capacitor 21 and resistor 22 also provide pulse shaping of the reset signal for application to transistor 25. Resistors 26 and 27 are respectively base and collector load resistors typically found in a common emitter connected transistor and are well known in the art.

Figure 7:
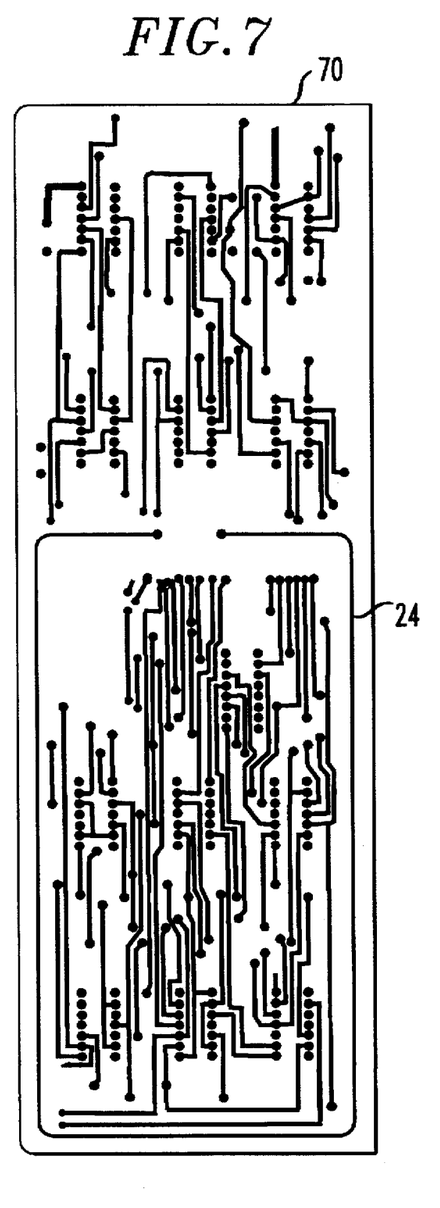
FIGS. 7 and 8 show the detectors of FIGS. 2 and 3, respectively, as traces on printed circuit boards.

A conducting loop 24, in accordance with the disclosed embodiment, detects radiated energy present in an electromagnetic field when an ESD event occurs in the device and applies a reset signal to the base of transistor 25 that results in a reset of the control unit and a latching of data in a latch, e.g., latch 115 or latch 157. Loop 24 is a conducting path or element, such as a wire or printed circuit board trace, (as seen in FIG. 7) typically a few inches long, that functions as a loop antenna for picking up radiated electromagnetic fields emanating from a nearby ESD event. A capacitor 23 resonates with loop 24 in a manner such that an ESD event causes an oscillatory voltage to appear at the base of transistor 25. Thus, either polarity of an ESD event causes transistor 25 to conduct and provide a reset signal to the control unit and a hold signal to the latch.

Figure 3:
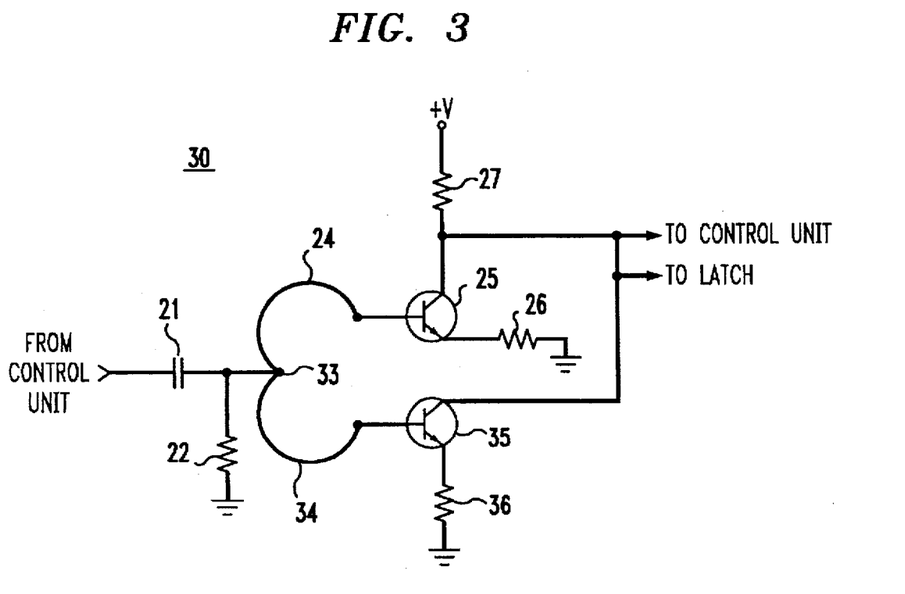
Figure 8:
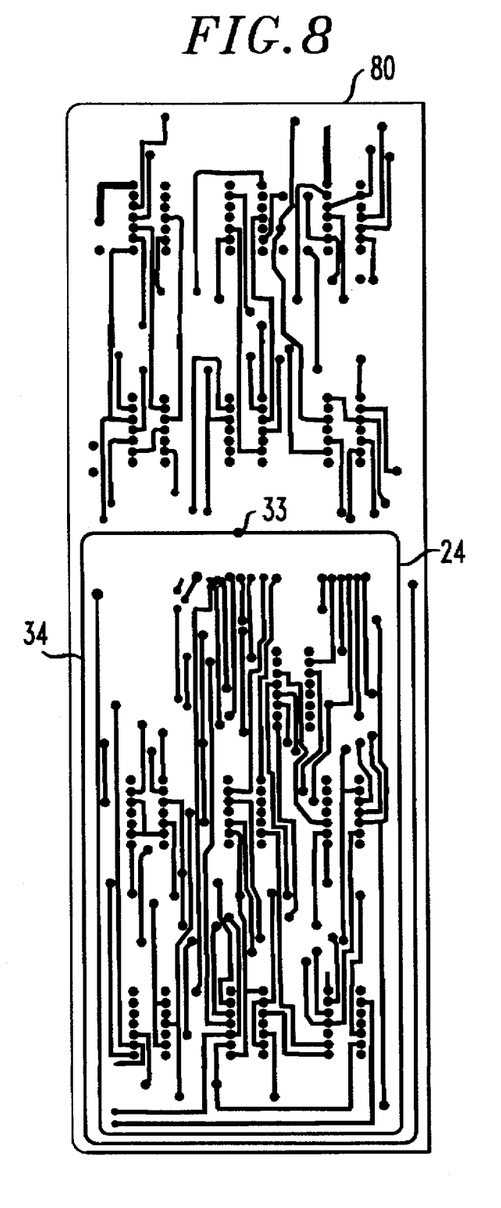

Referring next to FIG. 3, there is shown an ESD detector circuit 30 in which two loops are employed, in accordance with the disclosed embodiment. This detector circuit 30 incorporates some of the circuitry of detector circuit 20, shown in FIG. 2, including specifically loop 24 and transistor 25. A second loop 34 and a second transistor 35, along with its emitter resistor 36, are also employed in this detector circuit 30. See also FIG. 8.

The two loops 24 and 34 may be located adjacent to each other but are connected in opposite polarity, that is, loop 24 starts from node 33 and proceeds in a clockwise direction and loop 34 starts from node 33 and proceeds in a counter clockwise direction, for example. In this way, one or the other of transistors 25 or 35 will be driven into conduction for different polarity ESD events and the reset signal generated for the control unit and the latch when energy is received in a radiated electromagnetic field from an ESD event occurring in the device.

Figure 4:
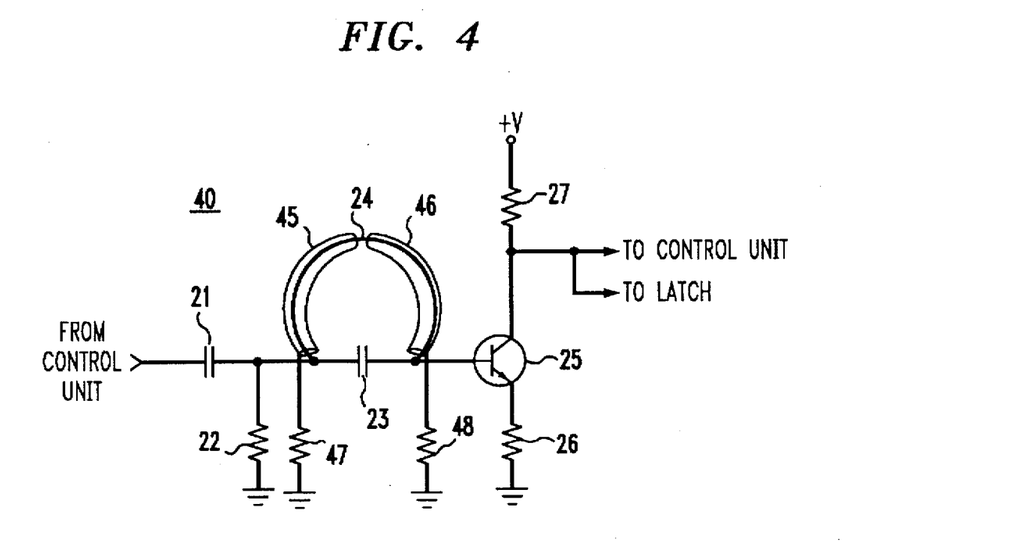

Referring next to FIG. 4, there is shown yet another ESD detector circuit 40, operable in accordance with the disclosed embodiment. This detector circuit 40 incorporates some of the circuitry of the detector circuit 20, shown in FIG. 2, including the conducting loop 24 and the transistor 25. Additional circuitry included in detector circuit 40 are electric field shields 45 and 46 and ground resistors 47 and 48 for these shields. With the shields 45 and 46 added around the loop 24, the reception of energy in an electric field is substantially prevented and the reception in the loop is essentially energy radiated in a magnetic field when the ESD event occurs in the device.

Figure 5:
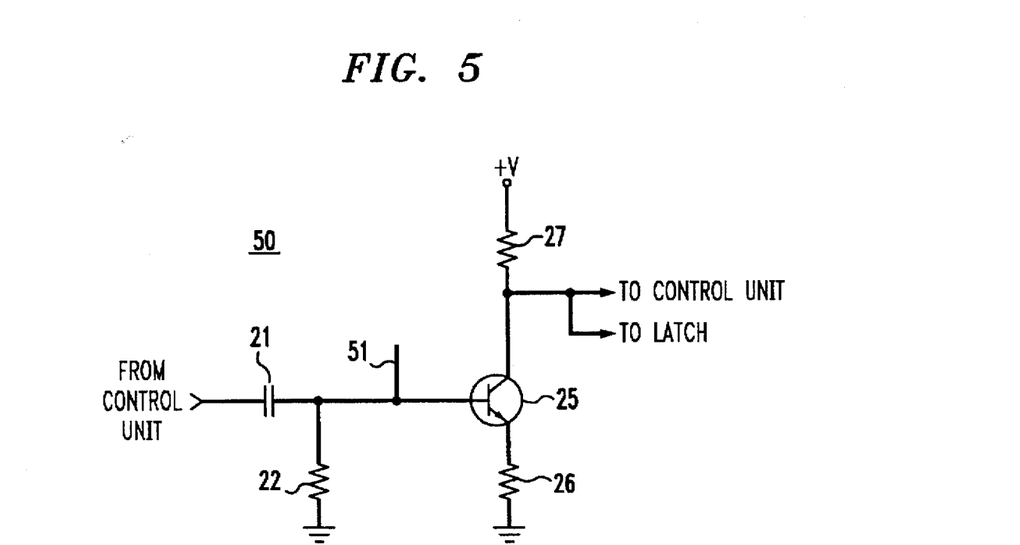

In FIG. 5, an ESD detector circuit 50 employs a short monopole antenna 51, in accordance with the disclosed embodiment. This detector circuit 50 also employs most of the circuitry in detector circuit 20, shown in FIG. 2. The monopole antenna 51 is incorporated in a detector circuit when it is desirable to sense the energy present in radiated electric fields rather than the energy present in magnetic fields when an ESD event occurs in the device. The output of the monopole antenna 51 is oscillatory, and thus, transistor 25 can be turned on from either polarity of an ESD event.

In FIGS. 2 through 5, detector circuits are illustratively disclosed that respond to either electric fields, magnetic fields, or a combination of both of these fields. For example, FIGS. 2 and 3 respond to a combination of electric and magnetic fields; FIG. 4 responds mostly to magnetic fields; and FIG. 5 responds mostly to electric fields. The selection of a suitable circuit for a particular device depends on the extent to which the device is vulnerable to ESD events and also factors such as cost and space considerations of the device into which the ESD event detector is incorporated.

The output signal of each of detector circuits 20, 30, 40 and 50 is a logic signal which is usable not only to force a reset condition but, in some applications, may be used for other functions, such as to initiate maintenance activities. Such maintenance activities may include checking for corruption of memory or the validity of other signals on other lines. Techniques to do this are well known in the art and include maintenance activities such as checksums and parity, as described in the books *Electrostatic Discharge and Electronic Equipment* by Warren Boxleitner, published by the IEEE Press, 1989, ISBN #0-87942-244-0, Chapters 3, 4, and 7, and *High Frequency Measurements and Noise in Electronic Circuits* by Douglas C. Smith, 1993, VanNostrand Reinhold, ISBN #0-442-00636-5, pp. 125–157.

Figure 6:
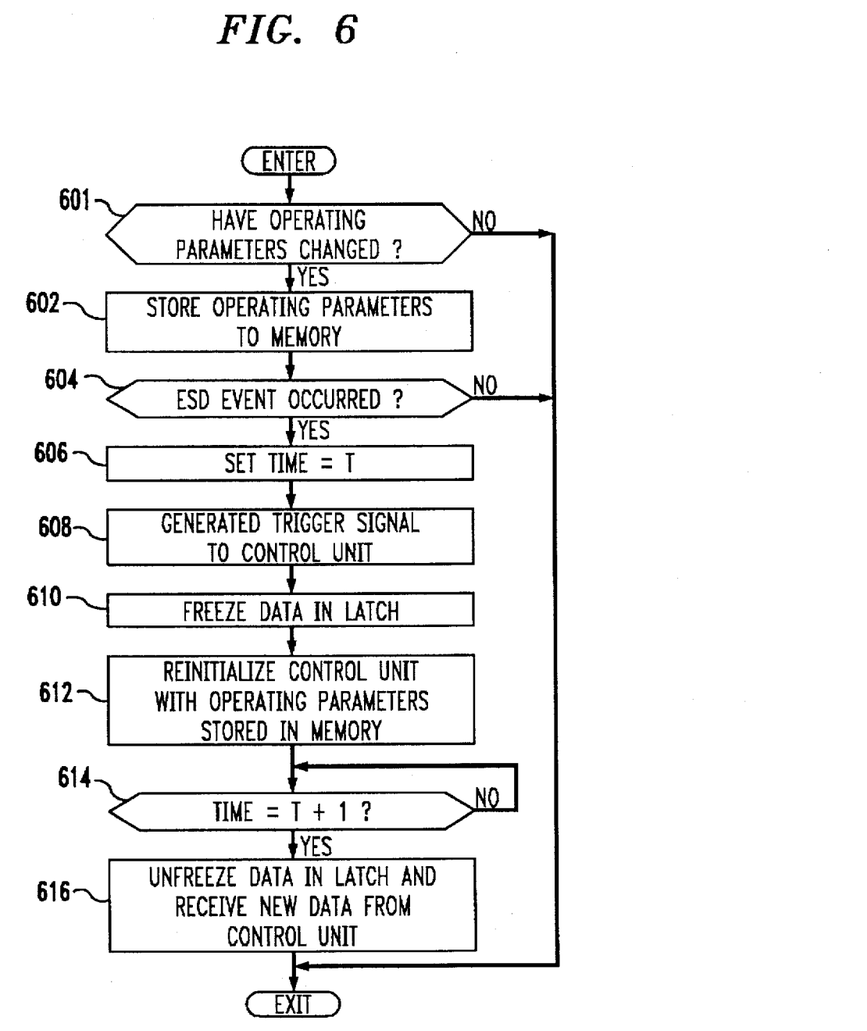
FIG. 6 is a flow diagram of a process suitable for incorporation into both the base unit and the handset unit of the cordless telephone illustratively shown in FIG. 1 in accordance with the invention.

Referring now to FIG. 6, there is shown a flow chart illustrating the operation of the handset unit 10 and the base unit 15 in performing a process which includes the ESD detection and reconfiguration operation. The functions performed by control units 110 and 150 are advantageously determined by a process or program contained in the ROM respectively located in these control units.

The process is entered at decision 601 where a determination is made as to whether the operating parameters have changed from those previously stored in memory. If there has been no change in the operating parameters, the process is exited. If, however, the operating parameters have changed, the process advances to step 602 where the memory is updated by storing the new operating parameters. With this "image" or "snapshot" available and upon the occurrence of an ESD event in the control unit, the control unit can be reinitialized.

From step 602, the process advances to decision 604 where it is determined if an ESD event has occurred in the device. If an ESD event has not occurred, the process is exited. If an ESD event has occurred, however, the process advances to the step 606 where a timer is set. This timer is set to be just long enough for a full recovery of the control unit from the ESD event to be completed, while keeping the effects of the ESD event transparent to the user. Such time, as earlier described herein, is typically 250 milliseconds.

From the step 606, the process advances to step 608 wherein a trigger signal, generated in an ESD detector circuit, is coupled to a control unit for reinitializing this control unit. For example, the control unit 110 or 150 is reinitialized by the trigger signal from the ESD detector 116 or 158 and loaded with the last image of the status information stored in the memory 117 or 159.

From the step 608, the process advances to step 610 wherein data in a buffer of a latch is held or frozen by the generation of the trigger signal to the latch. In this step, the latch does not accept new data from the control unit for coupling to other components in the device. Rather, the latch continues to provide the existing data being held therein to these components. From step 610, the process advances to step 612 wherein the control unit is reinitialized with the data stored in memory in step 602, described hereinabove. This effectively restores the control unit 110 or 150 to the exact state it was in when the image was created and just prior to the occurrence of the ESD event.

Once the time in the timer is equal to T+1 or 250 milliseconds have expired, the process, having advanced from step 612 to decision 614 where this time period is determined, next advances to step 616 where the data being held in the latch is unfrozen and new data is received in the latch for coupling to components in the device. From step 616, the process is exited.

While the foregoing invention has been described in terms of the above-detailed embodiments, it will be readily apparent to those skilled in the art that various modifications can be made. For example, the ESD event detector could trigger an alarm to attract the attention of a system operator and/or safely and orderly shut down the equipment being controlled. An example of such equipment might be an industrial process controller or a telephone central office. Accordingly, such modifications are contemplated as being within the knowledge of one skilled in the art and may be utilized without departing from the spirit and scope of the claimed invention.

We claim:

1. An arrangement for minimizing adverse effects of electrostatic discharge events occurring in a wireless telephone, the arrangement comprising:

controller means for executing programs for controlling the operation of said wireless telephone, the controller means including reconfiguring means for initializing the controller means after the occurrence of an electrostatic discharge event;

memory means for storing status information for use by said controller means;

latch means for buffering data generated by said controller means for circuitry in said device, said data being coupled through said latch means to said circuitry for selecting an operating state for said circuitry, said latch means including reconfiguring means;

a detector circuit for detecting an electrostatic discharge event occurring in said wireless telephone, said detector circuit generating a trigger signal and applying said trigger signal to said controller reconfiguring means and said latch reconfiguring means when said electrostatic discharge event is detected; and said controller reconfiguring means, operably responsive to said trigger signal, retrieving said status information from said memory means and using said status information for initializing said controller means, said latch reconfiguring means further reconfiguring said latch means for retaining said data stored therein for a predetermined period and providing said data to said circuitry for maintaining an existing operating state of said circuitry for said predetermined period.

2. The arrangement of claim 1 wherein said status information retrieved from said memory means is contained in a program being executed by said controller means just prior to receipt of said trigger signal by said controller reconfiguring means.

3. The arrangement of claim 2 wherein said status information includes operating parameters for said wireless telephone.

4. The arrangement of claim 3 wherein said operating parameters include the selected frequency of operation and security code data.

5. The arrangement of claim 4 wherein said memory means is a non-volatile memory.

6. The arrangement of claim 5 wherein said non-volatile memory is an electrical-erasable-read-only memory.

7. The arrangement of claim 1 wherein said detector circuit comprises a conducting element for receiving energy present in a radiated electromagnetic field when said electrostatic discharge event occurs in said wireless telephone.

8. The arrangement of claim 7 wherein said conducting element is a loop antenna.

9. The arrangement of claim 7 wherein said conducting element is a trace on a printed circuit board located in said wireless telephone.

10. The arrangement of claim 1 wherein said detector circuit comprises a first conducting element and a second conducting element, said first conducting element being configured in a manner for receiving energy in a radiated electromagnetic field having a voltage with a first polarity when said electrostatic discharge event occurs in said wireless telephone, and said second conducting element being configured in a manner for receiving energy in said radiated electromagnetic field having a voltage of a second polarity when said electrostatic discharge event occurs in said wireless telephone.

11. The arrangement of claim 10 wherein said first and second conducting elements are both loop antennas.

12. The arrangement of claim 10 wherein said first and second conducting elements respectively comprise a first and a second trace on a printed circuit board located in said wireless telephone.

13. The arrangement of claim 1 wherein said detector circuit includes means for receiving energy present in a radiated magnetic field when said electrostatic discharge event occurs in said wireless telephone.

14. The arrangement of claim 13 wherein said receiving means includes a conducting element and a pair of electric field shields around a portion of said conducting element for substantially preventing the reception of energy present in an electric field when said electrostatic discharge event occurs in said wireless telephone.

15. The arrangement of claim 1 wherein said detector circuit includes means for receiving energy present in a radiated electric field when said electrostatic discharge event occurs in said wireless telephone.

16. The arrangement of claim 15 wherein said receiving means includes a monopole antenna for receiving said electric fields present when said electrostatic discharge event occurs in said wireless telephone.

17. An arrangement for minimizing adverse effects of electrostatic discharge events occurring in a device, the arrangement comprising:

controller means for executing programs for controlling the operation of said device, the controller means including reconfiguring means for initializing the controller means after the occurrence of an electrostatic discharge event;

memory means for storing status information for use by said controller means;

latch means for buffering data generated by said controller means for circuitry in said device, said data being coupled through said latch means to said circuitry for selecting an operating state for said circuitry, said latch means including reconfiguring means;

a detector circuit for detecting an electrostatic discharge event occurring in said device, said detector circuit generating a trigger signal and applying said trigger signal to said latch reconfiguring means and said controller reconfiguring means when said electrostatic discharge event is detected; and said controller reconfiguring means, operably responsive to said trigger signal, retrieving said status information from said memory means and using said status information for initializing said controller means, said latch reconfiguring means further reconfiguring said latch means for retaining said data stored therein for a predetermined period and providing said data to said circuitry for maintaining an existing operating state of said circuitry for said predetermined period.

18. A method of minimizing adverse effects of electrostatic discharge events occurring in a device, the method comprising the steps of:

executing programs in a controller for controlling the operation of said device;

storing status information in a memory for use by said controller;

detecting an electrostatic discharge event occurring in said device;

buffering data generated by said controller for circuitry in said device, said data being coupled through a latch to said circuitry for selecting an operating state for said circuitry;

generating a trigger signal in response to said electrostatic discharge event and applying said trigger signal to said controller and to said latch; and reconfiguring both said controller and said latch in response to said trigger signal, said controller being reconfigured by retrieving said status information from said memory and using said status information for initializing said controller, and said latch being configured for retaining said data stored therein for a predetermined period and providing said data to said circuitry for maintaining an existing operating state of said circuitry for said predetermined period.

19. The method of claim 18 wherein said status information retrieved from said memory is contained in a program being executed by said controller just prior to receipt of said trigger signal by said controller.

20. The method of claim 19 wherein said memory is a non-volatile memory.

21. The method of claim 20 wherein said detecting step further includes the step of configuring a conducting element for receiving energy present in a radiated electromagnetic field when said electrostatic discharge event occurs in said device.

22. The method of claim 21 wherein said conducting element is a loop antenna.

23. The method of claim 21 wherein said conducting element is a trace on a printed circuit board located in said device.

24. The method of claim 18 wherein said detecting step further includes the step of configuring a first and a second conducting element for receiving energy present in a radiated electromagnetic field, said first conducting element being configured for receiving energy in said radiated electromagnetic field having a voltage with a first polarity when said electrostatic discharge event occurs in said device, and said second conducting element being configured in a manner for receiving energy in said radiated electromagnetic field having a voltage of a second polarity when said electrostatic discharge event occurs in said device.

25. The method of claim 24 wherein said first and second conducting elements are both loop antennas.

26. The method of claim 24 wherein said first and second conducting elements respectively comprise a first and a second trace on a printed circuit board located in said device.

27. The method of claim 18 wherein said detecting step further includes the step of configuring a conducting element for receiving energy present in a radiated magnetic field when said electrostatic discharge event occurs in said device.

28. The method of claim 27 wherein said configuring step includes configuring a pair of electric field shields around a portion of said conducting element for substantially preventing the reception of energy present in an electric field when said electrostatic discharge event occurs in said device.

29. The method of claim 18 wherein said detecting step further includes the step of configuring a conducting element for receiving energy present in a radiated electric field when said electrostatic discharge event occurs in said device.

30. The method of claim 29 wherein said configuring step includes configuring said conducting element into a monopole antenna for receiving said electric field present when said electrostatic discharge event occurs in said device.

31. A method of minimizing adverse effects of electrostatic discharge events occurring in a wireless telephone, the method comprising the steps of:

executing programs in a controller for controlling the operation of said wireless telephone;

buffering data generated by said controller for circuitry in said wireless telephone, said data being coupled through a latch to said circuitry for selecting an operating state for said circuitry;

detecting an electrostatic discharge event occurring in said wireless telephone;

generating a trigger signal in response to said electrostatic discharge event and applying said trigger signal to said controller and to said latch; and reconfiguring both said latch and said controller in response to said trigger signal, said latch being configured for retaining said data stored therein for a predetermined period and providing said data to said circuitry for maintaining an existing operating state of said circuitry for said predetermined period, and said controller being configured for retrieving status information from a memory and using said status information for initializing said controller.

32. An arrangement for minimizing adverse effects of electrostatic discharge events occurring in a device, the arrangement comprising:

controller means for executing programs for controlling the operation of said device;

latch means for buffering data generated by said controller means for circuitry in said device, said data being coupled through said latch means to said circuitry for selecting an operating state for said circuitry;

a detector circuit for detecting an electrostatic discharge event occurring in said device, said detector circuit generating a trigger signal and applying said trigger signal both to said controller means and to said latch means when said electrostatic discharge event is detected; and means in said controller means and said latch means for recovering from said ESD event by using said trigger signal.

33. The arrangement of claim 32 wherein said recovery means is a reset of the controller means by retrieving status information from a memory and using said status information for initializing the controller means, and a latching of the latch means for retaining data stored therein for a predetermined period and providing the data to the circuitry for maintaining an existing operating state of said circuitry for said predetermined period.

34. The arrangement of claim 32 wherein said recovery means is a safe and orderly shutdown of the controller means.

35. The arrangement of claim 32 wherein said recovery means is an alarm indication.

36. An arrangement for minimizing adverse effects of electrostatic discharge events occurring in a device, the arrangement comprising:

controller means for executing programs for controlling the operation of said device; the controller means including reconfiguring means for initializing the controller means after the occurrence of an electrostatic discharge event;

memory means for storing status information in a memory for use by said controller means;

a detector circuit for detecting an electrostatic discharge event occurring in said device, said detector circuit generating a trigger signal in response to said electrostatic discharge event and applying said trigger signal to said reconfiguring means, said detector circuit including means for configuring a pair of electric field shields around a portion of a conducting element for receiving energy present in a radiated magnetic field when said electrostatic discharge event occurs in said device, said pair of electric field shields substantially preventing the reception of energy present in an electric field when said electrostatic discharge event occurs in said device; and said reconfiguring means reconfiguring said controller means in response to said trigger signal by retrieving said status information from said memory means and using said status information for initializing said controller means.

37. A method of minimizing adverse effects of electrostatic discharge events occurring in a device, the method comprising the steps of:

executing programs in a controller for controlling the operation of said device;

storing status information in a memory for use by said controller;

detecting an electrostatic discharge event occurring in said device, said detecting step including the step of configuring a pair of electric field shields around a portion of a conducting element for receiving energy present in a radiated magnetic field when said electrostatic discharge event occurs in said device, said pair of electric field shields substantially preventing the reception of energy present in an electric field when said electrostatic discharge event occurs in said device;

generating a trigger signal in response to said electrostatic discharge event and applying said trigger signal to said controller; and reconfiguring said controller in response to said trigger signal by retrieving said status information from said memory and using said status information for initializing said controller.

* * * * *